Nov. 3, 1942.  W. F. GOFF  2,300,498
INFLATION VALVE
Filed May 22, 1939   2 Sheets-Sheet 1
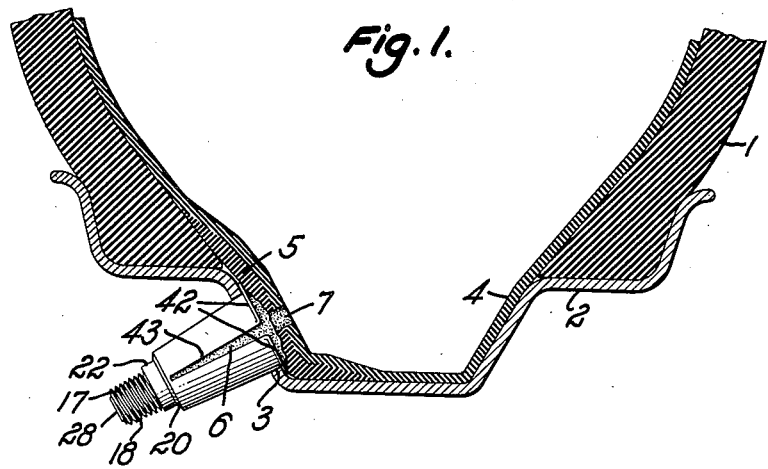
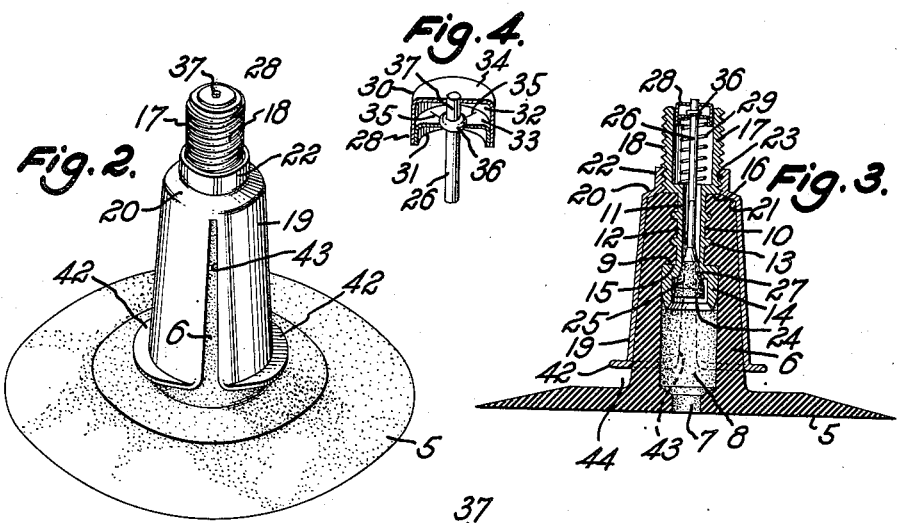
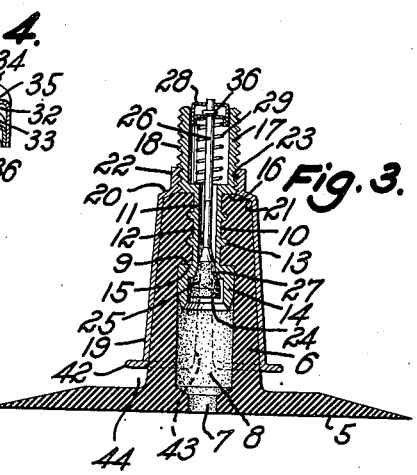
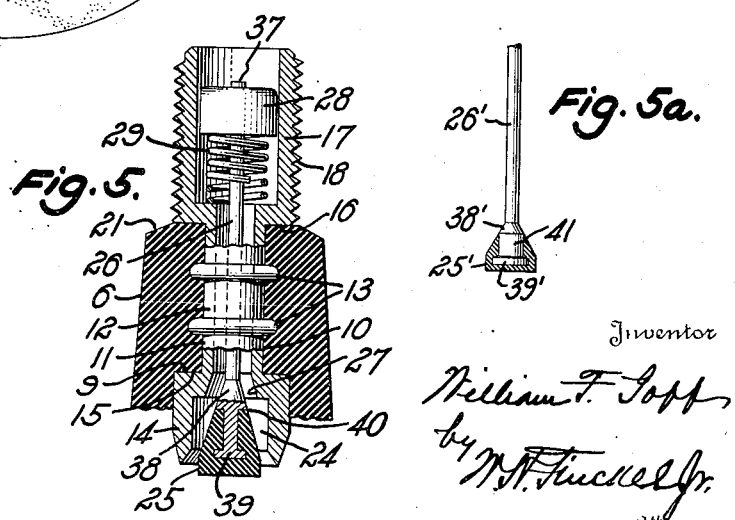
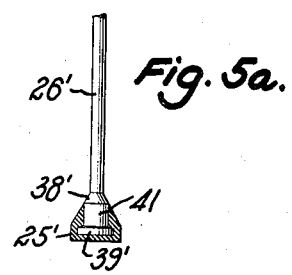
Inventor
William F. Goff
by M. F. Finckel Jr.
Attorney

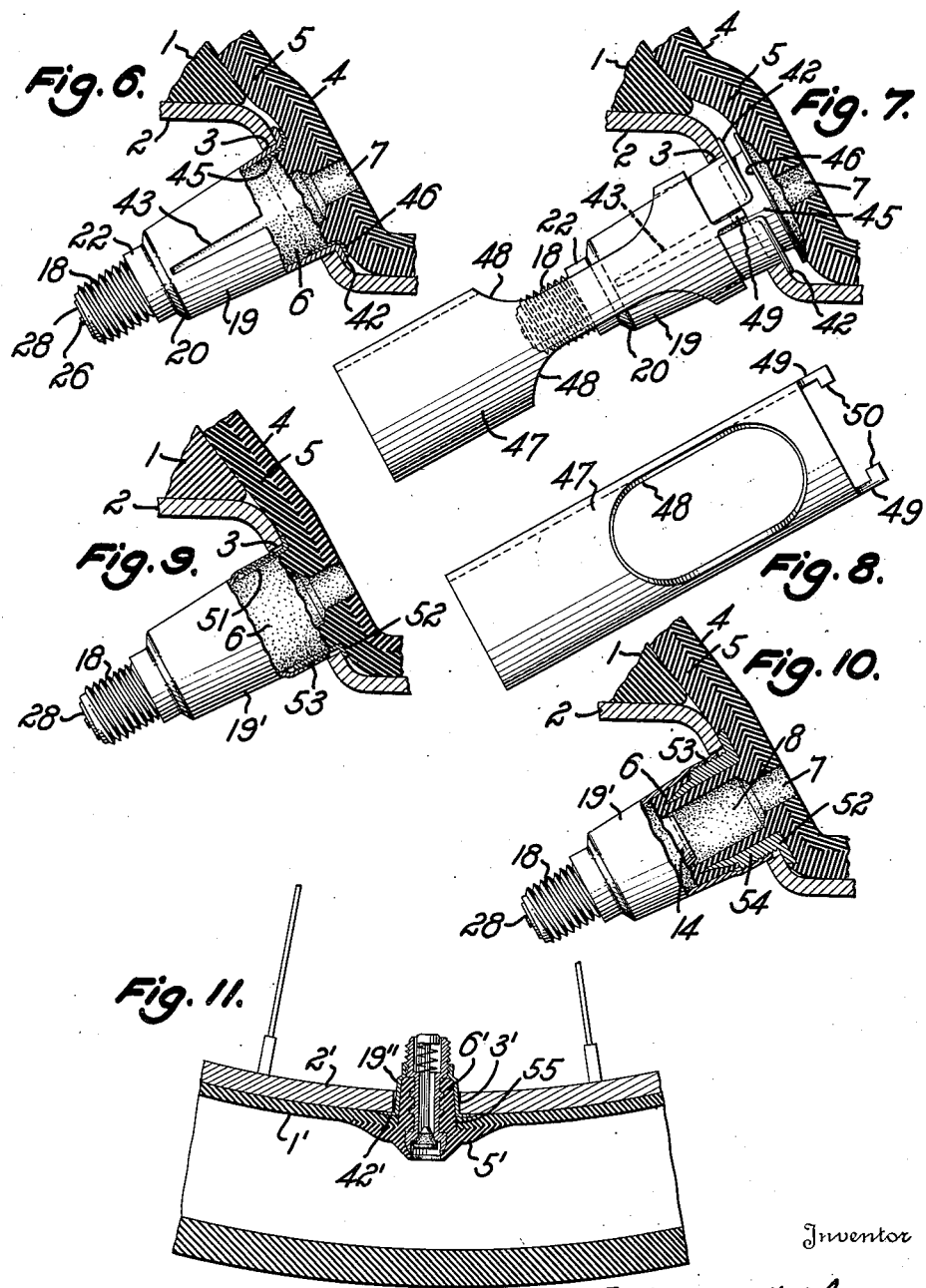

Patented Nov. 3, 1942

2,300,498

UNITED STATES PATENT OFFICE 2,300,498

INFLATION VALVE

William F. Goff, Akron, Ohio, assignor to The Ohio Injector Company, Wadsworth, Ohio, a corporation of Ohio Application May 22, 1939, Serial No. 275,114

13 Claims. (Cl. 152—430)

This invention relates to inflation valves, and particularly to such valves used with the pneumatic tires of vehicles.

Inflation valves as now generally constructed, particularly those used with vehicle tires, include a rubber stem element provided at one end with a laterally extending outwardly flaring pad or base by means of which the stem may be cemented, vulcanized or otherwise appropriately attached to a tire tube. The interior of the stem is generally provided with an axial bore or passage into which the parts constituting the valve proper extend, such parts usually including a core member within which are assembled the valve insides, and this core member is retained in fluid tight fixed relation to the rubber stem by vulcanizing it therein, or by the application, exteriorly of the stem, of some means such as a collar or winding tending to force the rubber of the stem into intimate engagement with the core member.

Such inflation valve structures have, to some extent, proved unsatisfactory in service for the reason that the fluid tight union of the core member with the rubber stem, particularly in the case where vulcanization of the parts is depended upon to hold them together, cannot be maintained, and leakage occurs, or even the core member and assembled valve parts may be blown completely out of the stem under the pressure of the confined inflation fluid.

Moreover, in constructions of the type referred to, the valve assembly proper is of somewhat expensive construction, in that if provision is to be made for replacement of worn out valve insides, such insides must be furnished as an assembly removable independently of the core member, which latter is fixedly united with the rubber stem, and in those cases where removable insides are not provided, failure of the valve necessitates discarding of the tube to which it is attached, unless some type of adapter containing a complete valve structure is applied to the stem.

One of the objects of the present invention is to furnish an inflation valve structure including the customary rubber stem in which the connection between the core member containing the valve proper is purely mechanical in nature, its connection with the rubber stem being such as to preclude the possibility of leakage.

Another object of the invention is to provide such an inflation valve structure in which the mechanical means employed for retaining the core member in fluid tight assembly with the rubber stem is such that it will cooperate with the rim of the vehicle wheel upon which the tire is mounted to prevent separation of the valve parts from the rubber stem under normal operating conditions, and particularly under the influence of the fluid pressure exerted from within the tire.

A still further object of the invention is to provide an inflation valve structure in which, due to the purely mechanical connection between the valve parts and stem, removal and replacement of worn out valve parts may be accomplished.

Furthermore, in accordance with present standard practice, the inflation valve structure of the invention will permit withdrawal of the parts outwardly through the wheel rim if deflation of the tire should occur, particularly during the rotation of the wheel, without injury to the tube or valve structure.

Another object of the invention is to provide certain refinements in the construction of the valve pin and its valve, and in the means whereby it is operatively assembled within the core member.

The invention contemplates an inflation valve including, in combination with a valve stem made of rubber or other appropriate yieldable material and preferably tapered, a shouldered bore within said stem, a core member having a portion extending into such bore and terminally enlarged to seat against the shoulder thereof, and a sleeve element arranged exteriorly of the stem and embracing the stem and preferably tapered for increasingly intimate engagement therewith, the core member and sleeve being provided with interengaging means preferably arranged exteriorly of the stem, such as complemental screw-threads, and the sleeve formed for abutment against the end of the stem so that pressure exerted between the core member, sleeve, and stem will force the terminal enlargement of the core member into intimate fluid tight engagement with the shoulder of the stem bore, the sleeve being provided with an offstanding base lip for engagement with the vehicle wheel rim between such rim and the tire tube, and the sleeve preferably being slitted longitudinally to permit its lateral compression substantially radially of the stem to accomplish disengagement of the lip from the rim and withdrawal of the sleeve inwardly through the valve opening of the rim. And the invention contemplates, further, various modifications of and additions to this assembly, and various refinements of the valve structure proper, all as will be explained hereinafter more fully and finally claimed.

In the accompanying drawings illustrating the invention, in the several figures of which like parts are similarly designated, Figure 1 is a fragmentary transverse sectional elevation of a vehicle tire and rim including the valve structure of the invention.

Fig. 2 is an enlarged perspective view of the valve structure prior to its application to a tire tube.

Fig. 3 is an axial sectional elevation of the valve structure illustrated in Figs. 1 and 2.

Fig. 4 is a further enlarged fragmentary sectional elevation showing, in perspective, a preferred novel form of valve pin retainer.

Fig. 5 is an enlarged fragmentary sectional elevation illustrating details of parts shown in Fig. 3 but with the valve in open position.

Fig. 5a illustrates a modified form of valve pin and valve construction.

Fig. 6 is an enlarged fragmentary sectional elevation illustrating a modified form of the invention.

Fig. 7 is a view somewhat similar to Fig. 6 and illustrating the application of a tool for facilitating removal of the sleeve and associated parts.

Fig. 8 is a view of the tool illustrated in Fig. 7 but showing the same turned about its longitudinal axis through an angle of 90°.

Figs. 9 and 10 are views similar to Fig. 6, but illustrating two further modified embodiments of the valve structure, and Fig. 11 is a fragmentary sectional elevation showing the valve structure of the invention adapted to a bicycle or other tire in which an inner tube is not employed.

Referring to Figs. 1 to 5 inclusive, it will be seen that the invention is shown in combination with a conventional demountable tire shoe or casing 1 mounted upon a rim 2 of accepted type in which the valve opening 3 is arranged at the side so that the tire valve extends laterally and angularly therefrom, although this is not essential, and it will be understood that the valve structure of the invention is capable of use in connection with tires or other inflated structures otherwise mounted.

Within the shoe 1 is arranged the customary inner tube 4 to which is cemented, vulcanized, or otherwise affixed the pad or base 5 of the yieldable or rubber valve stem 6, an opening 7 through the tube 4 and pad 5 communicating with the interior enlarged bore 8 of the stem, which enlargement terminates in a shoulder 9 from which the bore 10 extends outwardly to the outer extremity of the stem of reduced diameter.

The core member 11 comprises a central tubular portion 12 of an exterior diameter substantially the same as that of the bore extension 10 and is provided with one or more offstanding annular beads 13 for a purpose hereinafter appearing. At its inner extremity, the core member is enlarged to cup formation 14 tapered at its free end to facilitate insertion of the core member into the bore 8 through the bore extension 10, and providing at its junction with the central tubular portion an annular offset or shoulder 15 complemental to the shoulder 9. At the opposite end of the central tubular portion 12 the core member is enlarged to provide an abutment 16 normally in engagement with the outer end of the stem 6, and a tubular extension 17 adapted to receive and confine the valve spring and valve pin retainer hereinafter more particularly referred to. The exterior of the extension 17 is preferably provided with a screw-thread 18.

It will be noted that the yieldable or rubber valve stem is of tapered or substantially frusto-conical form, thus making possible progressive compression of its body into engagement with the parts of the core member by means of a complementally shaped sleeve 19 formed at its outer end with an annular closure 20 normally bearing against the end 21 of the stem and provided with an axial tubular extension 22 having an interior screw-thread 23 complemental to the screw-thread 18. Interconnecting means for the extension 17 and sleeve 19 other than the screw-threads 18 and 23 may be used if desired.

The cup formation 14 provides a recess 24 to normally enclose a valve proper 25 carried by a valve pin 26 and normally engaging a seat 27 formed in the bore of the core member. The shank of the valve pin 26 extends axially of this bore and is provided with a retainer 28 between which and the bottom of the tubular extension 17 is confined a valve spring 29 which serves to hold the valve 25 normally closed.

As illustrated in detail in Fig. 4, this pin retainer 28 may comprise two telescoping sheet metal cups 30 and 31 respectively, the cup 31 being arranged within the cup 30 and so positioned as to provide a space 32 between its top 33 and the top 34 of the cup 30, and having its top 33 provided with a central aperture of substantially the same diameter as that of the valve pin 26, from which aperture extend a plurality of radial slits 35 serving to impart to the top of the cup resiliency enabling it to be sufficiently deformed to pass an enlargement 36 of the valve pin and permit this enlargement to occupy a position within the space 32, the extension 37 of the pin beyond the enlargement 36 being centered in an appropriate aperture in the top 34 of cup 30. The cups 30 and 31 may be appropriately welded or otherwise secured together to provide a unitary retainer member which may be sprung with a snap action into engagement with the shank of the pin 26 over the enlargement 36 to complete the assembly of the valve parts within the core member.

Referring particularly to Fig. 5, it will be seen that the valve pin 26 may have its shank conically enlarged at 38 and may be provided with an end abutment or flange 39. The rubber valve proper 25 may be associated with the pin either as a pre-molded element having an interior socket complemental to the pin shank and abutment 39 between such abutment and the conical enlargement 38, so that it may be resiliently sprung upon the end of the valve pin and held by interengagement with the abutment 39, or it may be molded directly upon the end of the pin around the abutment 39 and terminating against the conical enlargement 38. In the case of molding, the annular edge 40 of the conical enlargement 38 serves as a cut-off in the mold to prevent creeping of the rubber upon the stem past this edge.

Whether the valve 25 is applied as a pre-molded member, or is molded directly upon the valve pin, the conical enlargement 38 substantially conforms in taper to the taper of the valve proper, thus producing, in effect, a continuation of the peripheral surface of the valve proper, and serving to guide the valve to its seat 27.

In the modified construction illustrated in Fig. 5a, the valve bearing end of the shank of the valve pin 26' is upset or otherwise enlarged as indicated at 41, and this enlargement merges at one end into the pin shank in a tapered or conical portion 38' and has its opposite end provided with an abutment or offstanding flange 39'. This modified form of valve pin tends to economize in the rubber used to produce the valve proper 25' but produces an assembly of efficiency equal to that of the form illustrated in Fig. 5, and separation of the rubber element constituting the valve proper from the pin is effectively prevented by means of the abutment or flange 39'.

The sleeve 19 is provided at its free end with lip or flange means 42 adapted to engage the surface of the rim 2 adjacent to the valve opening 3 therein and between the rim and the tire tube 4.

It will be noted, particularly by reference to Fig. 2, that the lip or flange means 42 is discontinuous about the periphery of the sleeve end, and the sleeve is bifurcated by diametrically opposite longitudinal slits 43 which permit the sleeve to be compressed against the rubber of the stem by the use of pliers or other appropriate tool to permit withdrawal of the lip or flange means 42 through the rim opening 3 when desired.

It will be noted, as illustrated particularly in Fig. 3, that, when the valve parts are assembled, the sleeve 19 is screwed down tightly upon the end 21 of the yieldable stem, thus drawing the offset 15 of the enlargement 14 into fluid tight engagement with the shoulder 9 of the bore 8, and at the same time radially compressing the material of the stem into intimate fluid tight engagement with the portion 12 of the core member and with the annular beads 13 thereof.

The length of the sleeve 19 is so proportioned that when completely screwed down upon the stem, there will be a space 44 between its lip or flange means 42 and the pad or base 5 of the stem. In other words, a part of the stem will extend beyond the flanged end of the sleeve. This is intentional, and makes possible further compression of the material of the stem within the sleeve under the influence of pressure within the tire, as illustrated in Fig. 1, where the pad or base 5 of the stem is shown in contact with the flanged end of the sleeve.

Thus, not only does the sleeve serve to intimately connect the core member with the stem by virtue of the counteracting forces exerted between the shoulder 20 and offset 15, and by virtue also of radial compression afforded by the complemental tapers of the sleeve and stem, but makes possible augmentation of the connection by compression of the stem material within the sleeve by pressure within the tire.

Moreover, the pressure within the tire acting upon the material of the stem within the sleeve causes the sleeve to be intimately engaged with the walls of the stem opening 3, thus insuring engagement of the lip or flange means 42 with the rim adjacent to the valve opening 3 and preventing such premature compression of the sleeve due to external causes as would make possible disengagement of the lip or flange means 42 from the rim and passage of them through the valve opening 3.

Thus, not only are the valve parts effectively mechanically connected with the stem by cooperation therewith of the sleeve and core member, but disconnection from the stem of the core member and the valve parts carried thereby and the sleeve connected therewith under the influence of excess air pressure within the tire, or by external means inadvertently acting upon the stem assembly is prevented, inasmuch as the lip or flange means of the sleeve, when in engagement with the rim, as illustrated in Fig. 1, will prevent any movement of the sleeve and the parts connected therewith axially of the stem, except when the sleeve is intentionally compressed or distorted radially or laterally, as described.

Furthermore, the sleeve 19 provides a full metal to metal contact between the valve opening 3 of the rim and the stem assembly, and precludes the possibility of shearing off of the stem as might otherwise conceivably occur. But the valve stem structure is nevertheless capable of withdrawal through the rim opening 3 and into the tire casing or shoe 1 upon deflation of the tire while travelling, in the manner for which present yieldable valve stems are designed. Also, the slitted formation of the sleeve provides for escape of air which might otherwise be trapped between the tube and casing of the tire, or between the tube and wheel rim.

It will thus be seen that the valve stem assembly of the invention embodies all of the advantages of valve stems of the types now generally accepted and, in addition, it embodies advantages in its purely mechanical assembly, its freedom from failure in use, its capability of replacement of worn out or defective valve parts, and the like.

In structural features the valve stem assembly of the invention is susceptible of many modifications. Some of such modifications are illustrated in Figs. 6 to 11 inclusive.

In Figs. 6 to 10, various types of reinforcing collets are shown.

In Figs. 6 and 7 the collet has a tapered annular body 45 and a continuous offstanding flange or rim 46 normally bearing against the base or pad 5 of the yieldable stem. This collet, when the tube 4 and its stem assembly are in operative arrangement, as illustrated in Fig. 6, has its annular body 45 extending within the sleeve 19 and its flange 46 bearing against the inner edge and lip or flange means 42 of the sleeve, thus holding the sleeve against lateral or radial compression and precluding the possibility of accidental withdrawal of its lip or flange means through the valve opening 3 of the rim.

When it is desired to disassemble this valve stem structure by collapsing or depressing the sleeve 19 laterally, the tool illustrated in Figs. 7 and 8, or other appropriate means may be employed. The tool illustrated comprises a tubular member 47 provided with opposite openings 48, and has at one end a pair of offstanding fingers 49 the ends 50 of which are laterally offset. When this tool is slipped over the valve stem assembly, as shown in Fig. 7, and pressed toward the rim 2 with the offsets 50 extending into the slits 43 of the sleeve, these offsets will engage the edge of the annular body 45 of the collet so that the collet may be forced out of engagement with the sleeve 19, as partly illustrated in Fig. 7. Thus when the collet is disengaged from the sleeve, the tool may be swung laterally with respect to the stem and sleeve and, while the ooffsets 50 are holding the collet out of engagement with the sleeve, the sleeve may be laterally compressed to free its lip or flange means from the rim.

Moreover, it will be apparent that, due to the inner diameter of the tube of the tool with respect to the outer tapered diameter of the sleeve, pressure upon the free end of the tool causing it to slide axially upon the sleeve will cause the sleeve to be compressed laterally, while at the same time the offsets 50 disengage the collet from the sleeve, thus tending to disengage the flange means 42 of the sleeve from the stem opening 3 of the rim. Such compression of the sleeve may, when necessary, however, be augmented by lateral swinging of the tool as hereinbefore described. The compression of the sleeve 19 necessary to free its flange means 42 from the valve opening 3 of the rim will, of course, be dependent upon the lateral projection of the lip or flange means 42 with respect to the diameter of the rim opening 3.

In Fig. 9 the collet has an annular body 51 and an offstanding flange 52 and is provided with an exterior screw-thread 53, or other appropriate attaching means, for cooperation with a complemental screw-thread or the like formed upon the interior of the sleeve 19'. In this modified form of the invention, it is the flange 52 of the collet which engages the wheel rim adjacent to the stem opening 3, and inasmuch as it is unnecessary to laterally or radially compress the sleeve 19' to permit disconnection thereof from the collet and rim, the longitudinal slits provided in the sleeve as hereinbefore described may be omitted. It is not necessary to appropriate functioning of this modified form of the invention that the screw-threads 18 of the core member have the same lead as those provided on the collet and sleeve, as any difference in lead between the two, and consequent difference in their engagement as the sleeve is rotated will be accommodated by virtue of the yieldable nature of the stem 6.

The modification illustrated in Fig. 10 is similar in operative characteristics to that illustrated in Fig. 9. However, instead of having the collet 54 formed as a separate member for application exteriorly of the stem 6, this collet is molded into the stem during the formation of the latter.

In Fig. 11 the structure of the invention is illustrated in its application to a bicycle tire or the like in which no inner tube is provided. In this form of the invention the base or pad 5' of the stem is inserted through an opening 55 in the inner well 1' of the tire and is cemented, vulcanized or otherwise appropriately united with the inner surface of this wall. The stem 6' is preferably made shorter than as disclosed in the other forms described, and the sleeve 19" is complementally shorter, but extends through the rim 2' a distance sufficient to accommodate pliers or other appropriate tool whereby it may be compressed laterally to disengage its lip or flange means 42' from the valve stem opening 3' of the rim 2'. The essential characteristics and features of assembly of the valve parts in this modification are substantially the same as in the form of the invention illustrated in Figs. 1 to 5.

Various changes and modifications are considered to be within the spirit of the invention and the scope of the following claims.

What I claim is:

1. In an inflation valve for pneutmatic vehicle tires, a yieldable valve stem, a valve core member, interengaging means forming parts of said stem and core member respectively and furnishing a purely mechanical connection between these parts, and a sleeve member embracing said stem and screwthreadedly engaged with said core member for controlled relative axial movement and serving to radially compress the stem to augment the mechanical connection of the stem and core member, said sleeve member provided with means for interlocking engagement with the rim of the vehicle wheel to insure assembled relation of said stem, core member and sleeve member, and said sleeve being removable from the stem while the tire is on the rim so that the core member may be removed from the stem.

2. In an inflation valve for pneumatic vehicle tires, a yieldable valve stem, a valve core member, interengaging means forming parts of said stem and core member respectively and furnishing a purely mechanical connection between these parts, and a lonigtudinally slitted sleeve member embracing and enclosing said stem throughout substantially its full length and in confining and substantially full circumferential engagement therewith, said sleeve member being adjustably and separably connected with said core member for movement axially of the stem to augment the mechanical connection of the stem and core member by compression of the stem, and said sleeve member being provided with offstanding flange means for interlocking engagement with the rim of the vehicle wheel between the rim and tire to insure asesmbled relation of said stem, core member and sleeve member, said sleeve member being radially compressible against said yieldable stem sufficiently to permit disengagement of its flange means from said rim while the tire is in inflated condition upon the rim to thus permit removal of the core member from the stem.

3. In an inflation valve for pneumatic vehicle tires, a yieldable valve stem provided with a shouldered axial bore, a valve core member assembled within said bore and provided with means complemental to and engaging the shoulder of said bore, said core member having an exteriorly screw-threaded portion extending beyond said stem, a sleeve member in screw-threaded engagement with the screw-thread of said core member and embracing said stem substantially throughout the length thereof, said sleeve member adjustable with respect to said stem and core member to insure fluid tight assembly thereof, and means on said sleeve member for interlocking engagement with the rim of the vehicle wheel, said sleeve member formed for radial distortion sufficient to permit disengagement of said interlocking means.

4. In an inflation valve for pneumatic vehicle tires, a yieldable longitudinally tapered valve stem provided with a shouldered axial bore, a valve core member assembled within said bore and provided with means complemental to and engaging the shoulder of said bore, said core member having an exteriorly screw-threaded portion extending beyond said stem, a sleeve member tapered complementally to said stem and in screw-threaded engagement with the screw-thread of said core member and embracing said stem substantially throughout the length thereof, said sleeve member adjustable with respect to said stem and core member to insure fluid tight assembly thereof by virtue of the complemental tapers of the sleeve member and stem, and means on said sleeve member for interlocking engagement with the rim of the vehicle wheel, said sleeve member formed for radial distortion sufficient to permit disengagement of said interlocking means.

5. In an inflation valve for pneumatic vehicle tires, a yieldable valve stem, a valve carrying core member arranged within said stem, and a sleeve member cooperating with said stem and core member to maintain fluid tight assembly thereof, said sleeve member being provided with means for engaging the vehicle wheel rim between the tire and rim adjacent to the valve opening in the rim, said sleeve being laterally compressible against said yieldable stem sufficiently to permit said rim engaging means to pass through said opening to thereby provide for disassembly of said valve.

6. In an inflation valve for pneumatic vehicle tires, a yieldable valve stem, a valve carrying core member arranged within said stem, a sleeve member cooperating with said stem and core member to maintain fluid tight assembly thereof, said sleeve member being provided with means for engaging the vehicle wheel rim between the tire and rim adjacent to the valve opening in the rim, said sleeve being formed for lateral compression to permit its rim engaging means to pass through said opening, and a collet embracing said stem and normally extending between said stem and sleeve to prevent such compression.

7. In an inflation valve for pneumatic vehicle tires, a yieldable valve stem, a valve carrying core member arranged within said stem, a sleeve member cooperating with said stem and core member to maintain fluid tight assembly thereof, said sleeve member being provided with means for engaging the vehicle wheel rim between the tire and rim adjacent to the valve opening in the rim, said sleeve being longitudinally slitted and thereby capable of lateral compression to permit its rim engaging means to pass through said opening, and a non-compressible annular collet embracing said stem and normally extending between said stem and sleeve to prevent compression of said sleeve.

8. In an inflation valve for pneumatic vehicle tires, a yieldable valve stem, a valve carrying core member arranged within said stem, a sleeve member cooperating with said stem and core member to maintain fluid tight assembly thereof, a collet embracing said stem and having an offstanding lip engaging the vehicle wheel rim between the rim and tire and thereby held against escape from said rim through the valve opening therein, and means for separably connecting said sleeve and collet.

9. In an inflation valve for pneumatic vehicle tires, a yieldable valve stem, a valve carrying core member arranged within said stem, a sleeve member cooperating with said stem and core member to maintain fluid tight assembly thereof, a collet embracing said stem and having an offstanding lip engaging the vehicle wheel rim between the rim and tire and thereby held against escape from said rim through the valve opening therein, and complemental screw-threads on said sleeve and collet for separably connecting and axially adjusting the same with respect to said stem.

10. In an inflation valve for pneumatic vehicle tires, a yieldable valve stem, a valve carrying core member arranged within said stem, a sleeve member cooperating with said stem and core member to maintain fluid tight assembly thereof, a collet partially embedded in and embracing said stem and having an offstanding lip engaging the vehicle wheel rim between the rim and tire and thereby held against escape from said rim through the valve opening therein, and means for separably connecting said sleeve and collet.

11. In an inflation valve structure for assembly with the yieldable valve stem of a pneumatic vehicle tire, a valve core member shouldered for engagement with a complemental internal shoulder of the valve stem to provide a purely mechanical connection between the core member and valve stem, and a sleeve member serving to embrace the valve stem and screw-threadedly engaged with said core member for controlled relative axial movement and serving to compress the stem to augment the mechanical connection of the stem and core member, said sleeve member provided with means for interlocking engagement with the rim of the vehicle wheel to assure assembled relation of said stem, core member and sleeve member and said sleeve member being removable from the stem while the tire is on the rim so that the core member may be removed from the stem.

12. In an inflation valve structure for assembly with the yieldable valve stem of a pneumatic vehicle tire, a valve core member shouldered for engagement with a complemental internal shoulder of the valve stem to provide a purely mechanical connection between the core member and valve stem, and a longitudinally slitted sleeve member embracing and enclosing said stem throughout substantially its full length and in confining and substantially full circumferential engagement therewith, said sleeve member being adjustably and separably connected with said core member for movement axially of the stem to augment the mechanical connection of the stem and core member by compression of the stem, and said sleeve member being provided with offstanding flange means for interlocking engagement with the rim of the vehicle wheel between the rim and tire to insure assembled relation of said stem, core member and sleeve member, said sleeve member being radially compressible against said yieldable stem sufficiently to permit disengagement of its flange means from said rim while the tire is in inflated condition upon the rim to thus permit removal of the core member from the stem.

13. In an inflation valve structure for assembly with the yieldable valve stem of a pneumatic vehicle tire, a valve core member shouldered for engagement with a complemental internal shoulder of the valve stem to provide a purely mechanical connection between the core member and valve stem, said member having an exteriorly screw-threaded portion adapted to extend beyond said stem, a sleeve member for screw-threaded engagement with the screw-thread of said core member and capable of embracing said stem substantially throughout the length of the stem, said sleeve member being adjustable with respect to the core member and the embraced stem to insure fluid tight assembly between the core member and stem, and means on the sleeve member for interlocking engagement with the rim of the vehicle wheel, said sleeve member being formed for radial distortion sufficient to permit disengagement of said interlocking means.

WILLIAM F. GOFF.